Dec. 16, 1952  G. W. SCHATZMAN  2,621,944
FENDER AND FENDER SHIELD ASSEMBLY
AND ATTACHING MEANS THEREFOR
Filed Nov. 29, 1946  3 Sheets-Sheet 1

Inventor
GEORGE W. SCHATZMAN

Patented Dec. 16, 1952

2,621,944

UNITED STATES PATENT OFFICE 2,621,944

FENDER AND FENDER SHIELD ASSEMBLY AND ATTACHING MEANS THEREFOR

George W. Schatzman, Detroit, Mich., assignor to Houdaille-Hershey Corporation, Detroit, Mich., a corporation of Michigan Application November 29, 1946, Serial No. 712,800

19 Claims. (Cl. 280—153)

This invention relates to fender and fender skirt or shield assemblies, and more particularly to an improved arrangement of means for attaching the fender shield to the fender.

In the vehicle industry, and particularly in the automobile industry, various means have been utilized to improve the appearance of vehicle fenders. The usual vehicle fender is provided with an opening which affords access to the vehicle wheel, and which permits the ready removal or replacement of the wheel in an axial direction. Since this opening inherently presents an unattractive outward appearance, detachable fender shields have been employed substantially to cover the opening ornamentally.

As the term "fender shield" shall hereinafter be employed, it refers to any member which is adapted to be secured to a fender or other portion of a vehicle body for the purpose of covering the opening in the fender or vehicle body which is provided for access to or removal of the vehicle wheel. Furthermore, as the term "fender" shall hereinafter be employed, it refers to any form of wheel fender in its broad sense, whether such fender be separated from the vehicle body part, partly separated from the vehicle body part, or actually an integral part of the vehicle body, and whether or not it projects outwardly away from the principal body portion of the vehicle.

An important object of the present invention is to provide a fender and fender shield assembly including novel means for securing the fender shield in the assembly.

Another object of the invention is to provide a novel fender shield construction which is economical to manufacture, which is rugged and reliable in use, and which is simple and easy to manipulate for assembly or disassembly with respect to a fender.

A further object of the invention is to provide an improved means for detachably securing a fender shield to a vehicle fender.

Still another object of the invention is to provide a novel three-point suspension for a fender shield.

A still further object of the invention is to provide an improved fender and fender shield assembly wherein the fender shield is applied to the fender initially at the top of the wheel access opening and is then secured fixedly adjacent the ends of the access opening.

Yet another object of the invention is to provide an improved mechanism for hingedly mounting a fender shield.

It is also an object of the invention to provide new and improved means for securing the end of a fender shield to a fender.

An additional object of the invention resides in the provision of novel quick releasable, but positively holding, latching means operable to hold the ends of a fender shield in assembled relation to a fender.

Other objects, features and advantages of the present invention will become readily apparent from the following detailed description of certain preferred embodiments thereof taken in conjunction with the accompanying three sheets of drawings, in which.

A fender and fender shield assembly embodying the features of the present invention may comprise a fender 20 having a wheel access opening 21 which is ornamentally closed by means of a fender shield 22. Both the fender 20 and the fender shield 22 are preferably made from a suitable sheet material, such as sheet metal, the fender being reinforced about the wheel opening 21 by means of an inwardly stepped reinforcing flange 23 which preferably affords a rabbet groove 24 within which an inturned angular edge reinforcing flange 25 on the fender shield panel is adapted to be received in such a manner as to have the fender shield lie substantially flush with the surface at the fender in assembly. A cushioning gasket 27 which may be made of resilient material such as rubber or the like may be carried by the reinforcing flange 23. At its ends, the fender shield 22 is adapted to be formed on a relatively large inturned radius as indicated at 28 conformable to an underslung radius of the lower margin of the fender shield.

According to the present invention, a three point suspension or attachment of the fender shield 22 is afforded (Fig. 2) comprising an upper fender shield attaching means 29 for centrally suspending the fender shield from the upper margin of the fender defining the access opening 21, and end attachment means 30 for securing the respective underslung end portions 28 of the fender shield in place with respect to the fender.

The central upper suspension means 29 (Figs. 2 and 3) preferably comprises a hinge mechanism by which the fender shield 22 is adapted to be initially manually connected to the fender 20 at the upper side of the wheel access opening 21 by carrying the upper edge of the fender shield, held substantially horizontally, in towards the fender, effecting a hinged interconnection and then swinging the fender shield down into the final assembled position thereof. To this end, the fender shield 22 carries a hinge member 31 which is preferably in the form of a relatively heavy sheet metal plate secured to the upper end portion of a fender shield reinforcing bar or strut 32 and having a curved hinge arm 33 extending upwardly and curving inwardly and then outwardly and clearing the fender shield reinforcing flange 25. The strut 32 preferably extends vertically at the inside center portion of the fender shield 22 and may be formed from sheet metal having the longitudinal edges reinforced by flanges 34 while the lower end thereof is reinforced by a foot flange 35 extending angularly inwardly therefrom. The foot flange 35 is secured as by means of rivets 37 to the top of a reinforcing bar 38 carried by a lower edge, inwardly extending supporting flange 39 on the fender shield. At its upper end, the strut 32 is snugly received within the channel provided by the fender shield reinforcing flange 25.

Figure 3:
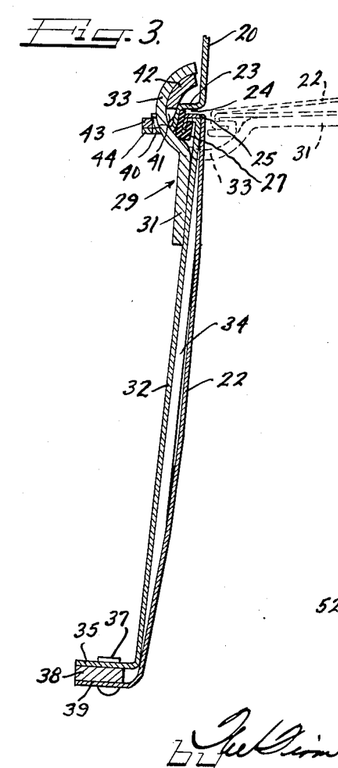
Figure 3 is an enlarged, vertical sectional detail view taken substantially along the line III—III of Figure 2.

In assembling the fender shield 22 with the fender 20, the end of the curved hinge arm 33 is projected through a hinge slot 40 formed in the lower portion of the fender reinforcing flange 23, substantially as shown in broken outline in Fig. 3. Registering with the hinge slot 40 is a hinge slot 41 in a hinge bracket 42 which, above the slot 41, is formed on a complementary curvature to the inside curvature of the hinge arm 33, and below the slot 41 is formed with a rearwardly extending base portion 43 secured as by spot welding or the like to an inwardly projecting supporting ledge portion 44 of the fender reinforcing flange. Through this arrangement, the hinge arm 33 moves smoothly and freely into hinged engagement with the bracket 42 and the interengagement of the hinge arm 33 and the hinge bracket 42 is such that when the fender shield 22 has been swung down into fully assembled position, as shown in full line in Fig. 3, the gasket 27 is placed under compression by the clamping action of the fender shield flange 25 drawn into the rabbet groove 24 by the hinge interaction. At the same time, the hinge arm 33, serving as a suspension hook bearing against the hinge bracket 42, holds the fender shield 22 against downward displacement in its plane. Removal of the fender shield 22 is easily and conveniently effected simply by swinging the fender shield up about the axis provided by the suspension hinge 29 until the hinge arm 33 clears the hinge bracket 42 and leaves the hinge apertures 40 and 41.

Figures 4, 5:
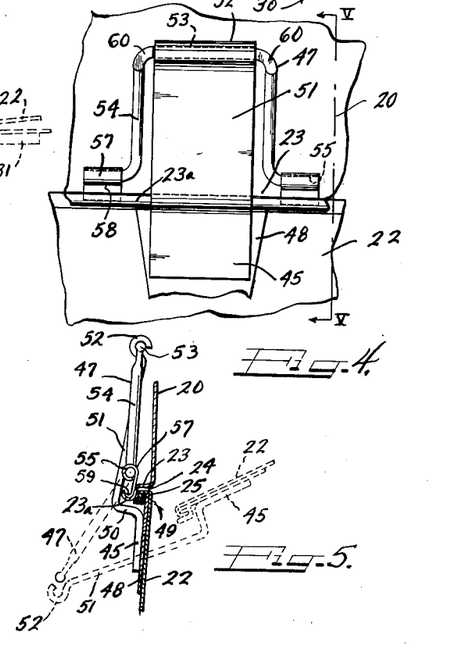
Figure 4 is a fragmentary, inside elevational view of a fender and fender shield assembly showing a modified form of the hinge mechanism for attaching the fender shield to the fender.
Figure 5 is a vertical sectional view taken substantially along the line V—V of Figure 4.

For some purposes it may be desirable to use a hinge structure on the order of that shown in Figures 4 and 5. An attribute of this hinge structure resides in its adaptability for incorporation in a fender and fender shield assembly without alteration or special construction for such assembly. To this end, the fender shield 22 is equipped with a hinge member 45 fixedly mounted thereon and engageable with a hinge member 47 which is pivotally mounted upon the fender 20, the construction and relationship of the hinge members being such that the fender shield 22 is adapted to be swung into and out of engagement with the fender 20 about an axis adjacent the top of the fender shield.

The fender shield-carried hinge member 45 preferably comprises an elongated metal plate which is secured as by means of welding or the like to a supporting plate 48 attached as by means of welding or the like to the inside upper marginal face of the fender shield 22. The supporting plate 48 has an inturned upper end reinforcing flange 49 secured within the channel provided by the upper end marginal reinforcing flange 25 on the fender shield. An offsetting bend or intermediate flange 50 in the hinge plate 45 clears the fender flange 23 in the assembled relationship of the fender and fender shield and provides an upwardly extending hinge arm 51 which is offset from the lower portion of the hinge plate 45 where the latter is secured to the supporting plate 48. For engagement with the fender carried hinge member 47, the upper terminal portion of the hinge arm 51 is formed into a hook-like marginal bearing 52.

The hinge member 47 is preferably formed from suitable wire, shaped on the order of a bail having a hinge bar 53 of a diameter to be received pivotally within the bearing hook 52. The mouth of the bearing 52 is of a width to pass the hinge bar 53 with a slight resistance, but permitting lateral entry and withdrawal of the hinge bar by yielding of the bearing mouth as permitted by the inherent resiliency of the material from which it is made. Parallel arms 54 connect the hinge bar 53 to oppositely extending, coaxial pintles 55 integrally formed at the terminal ends of the arms and pivotally received in bearings 57 which are preferably formed as marginal curls on respective bearing plates 58. The latter are preferably formed with the inturned rounded attachment flanges 59 at their opposite margins and which are secured, as by welding, within a hook portion 23a of the fender reinforcing flange 23.

The length of the hinge arm 51, and the overall length of the hinge member 47 are so related that in the fully assembled relationship of the fender and fender shield, the fender shield 22 is supported with its upper marginal reinforcing flange 25 snugly disposed within the rabbet groove 24 of the fender reinforcing flange 23.

Preferably, also, the hinge arm 51 is angled outwardly to a sufficient extent so that in the final assembly the hinge legs 54 extend substantially straight vertically or angled only slightly overcenter outwardly and are thus substantially relieved from bending stresses from the weight of the fender shield 22 carried by the hinge member 47 through the suspension afforded by the hinge hook 52 engaging the hinge bar 53. The weight of the fender shield is thus imposed upon the arms 54 substantially on their axes. Moreover, the connecting corners between the hinge bar 53 and the arm 54 may be flattened in the common or load plane of the hinge bar and arm, as indicated at 60, further to strengthen and stiffen the structure and assure freedom from distortion under load stress. This relatively strain-free relationship is further implemented by having the outer side of the arm 51 offset just sufficiently to engage the fender flange portion 23a in the fully assembled condition of the fender shield, thus avoiding lateral looseness or rocking in the upper portion of the fender shield and in the hinge structure.

Furthermore, the engagement of the hinge arm 51 with the flange portion 23a is such as to draw the upper edge flange 25 of the fender shield clampingly toward the depending portion of the fender flange 23. This places the gasket 27 under compression and assures a snug rattle-free assembly.

In mounting the fender shield 22, the hinge member 47 will be in the swung-down position, as shown in dash outline in Figure 5, and the hinge member 45 is then directed, by maneuvering the fender shield, into position until the bearing hook 52 engages the hinge bar 53 and is interengaged therewith by an upward and outward pull against the hinge bar 53 which snaps the hook into bearing relation thereon. Then the fender shield 22 may be swung down about an axis involving the upper marginal flange 25 thereof, which will cause swinging of the hinge member 51 upwardly through a hinging arc until the fully assembled relationship shown in full line in Figs. 4 and 5 is attained. Thereafter, similarly as in the case of the hinge shown in Fig. 3, the operatively suspended fender shield 22 is adapted to be secured in such position by completing the attachment thereof to the fender 20 through the medium of the end attaching means 30.

Figure 1:
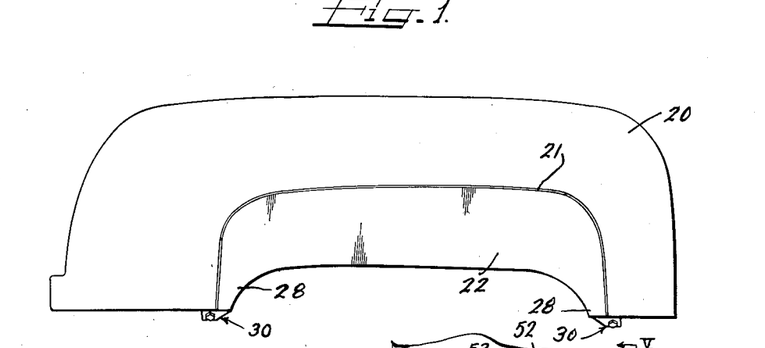
Figure 1 is a side elevational view of a fender and fender shield assembly embodying the features of the present invention.
Figures 2, 6, 7:
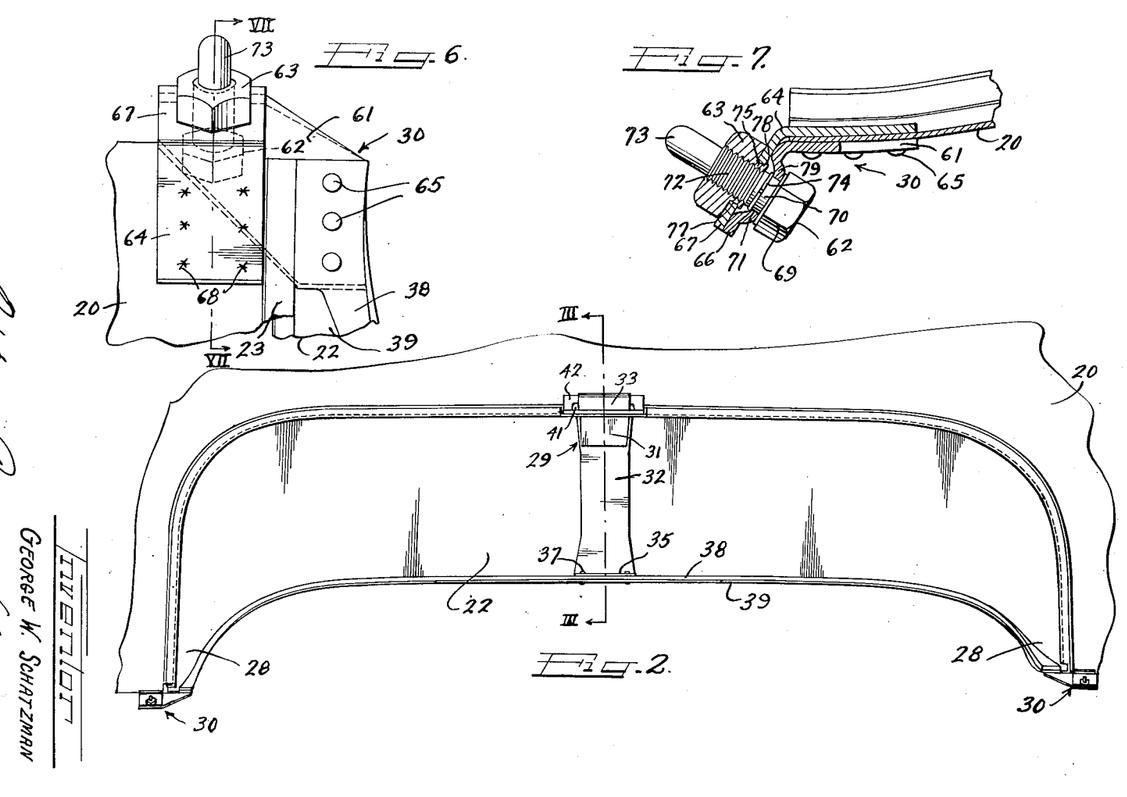
Figure 2 is an enlarged fragmentary, inside elevational view showing the fender shield in its entirety and that portion of the fender with which the fender shield immediately cooperates at the wheel access opening.
Figure 6 is a top plan view of one of the novel devices for securing the ends of the fender shield to the fender.
Figure 7 is a sectional detail view taken substantially along the line VII—VII of Figure 6.

For purposes of standardization, both of the attaching means 30 at the respective opposite ends of the fender shield 22 may be of substantially identical construction with such variations as may be necessitated by the particular end of the fender shield which is to be attached thereby. Accordingly, each of the attaching means 30 includes a bracket arm 61 carried by the fender shield and carrying a securing member 62 adapted to mate with a securing member 63 carried by a bracket arm 64 on the fender portion 28 (Figs. 6 and 7). The bracket member 61 may be in the form of a relatively heavy gauge sheet metal plate secured as by means of rivets 65 to the underside of the fender shield reinforcing flange 39 and extending laterally and inwardly beyond the end of the fender shield. The inner end portion of the bracket plate 61 is angled obliquely inwardly and downwardly to provide an attachment flange 66 adapted to abut a similarly complementary obliquely downwardly and inwardly angled attachment flange 67 on the bracket member 64. The latter is also preferably in the form of a metal plate which may be attached as by spot welding 68 to the upper or inner surface of the fender 20 adjacent to the terminus of the fender reinforcing flange 23.

The attachment members 62 and 63 are preferably in the form of threadedly interengageable stud and nut members, respectively. To this end, the stud member 62 is formed with a head 69 such as a hexagonal head adapted to be engaged by a suitable wrench and having a shank 70 extending inwardly through an aperture 71 in the hanger member flange 66 and formed with threads 72 engaging within the mating nut member 63. A smooth pilot extension 73 on the shank 70 beyond the threads 72 is preferably provided for piloting the connector shank through the nut 63 in the initial phase of assembly therewith.

Both the stud 62 and the nut 63 are preferably so constructed as to be in permanent assembly with the respective bracket plates 61 and 64. Accordingly, the stud is provided with a split ring collar 74 spaced beyond the head 69 a sufficient distance to provide a retainer between which the margin defining the aperture 71 of the flange 66 is retained in freely rotatable rotation. The nut 63 is provided with a relatively small diameter, tubular retaining projection 75 which extends through an aperture 77 in the flange 67 and has the free end thereof upset or peened over to provide a retaining flange 78, thereby securing the nut 63 fast upon the flange 67 in position for registration therewith of the stud 62. To afford clearance for the retaining flanges 74 and 78, the bracket flange 66 may be formed with a pressed out clearance boss 79. With this arrangement, when the fender shield 22 is swung down to the fully assembled relationship with the fender 20, the pilot 73 automatically guides the stud 62 into the mating nut 63 and then final assembly is effected by threading the stud 62 into the nut 63, the preferred relationship being such that full tightening places the fender shield under tensioned attachment to the fender, or at least places the antirattle gasket 27 under compression. Removal of the fender shield 22 is accomplished easily and simply by disconnecting the stud 62 and swinging the fender shield outwardly and upwardly for disconnecting the hinge structure 29 in the manner hereinbefore described.

Figures 8, 9, 10, 11, 12, 13, 14, 15:
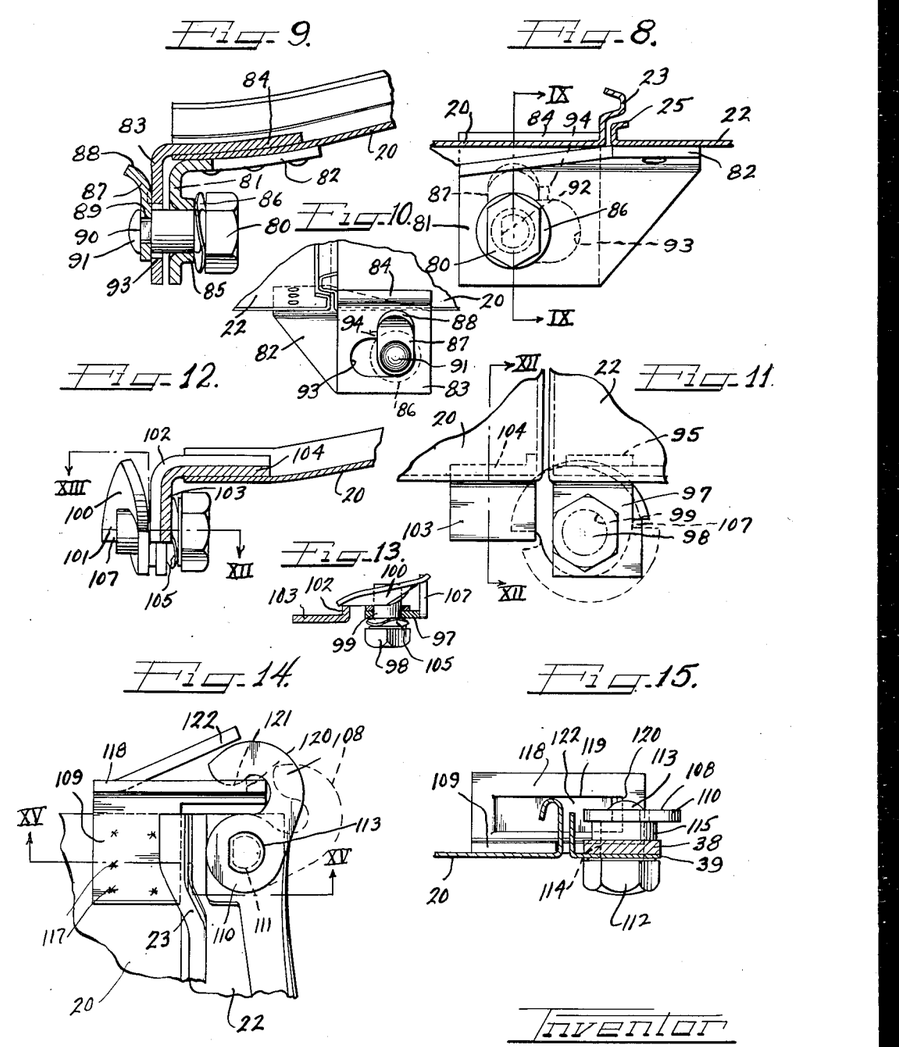
Figure 8 is a fragmentary sectional elevational view of a modified form of attaching device for the ends of the fender shield.
Figure 9 is a vertical sectional view taken substantially along the line IX—IX of Figure 8.
Figure 10 is a rear elevational view of the form of the invention shown in Fig. 8.
Figure 11 is a fragmentary sectional elevational view showing a further modified form of device for securing the ends of the fender shield in place on the fender.
Figure 12 is a vertical, sectional view taken substantially along the line XII—XII of Figure 11.
Figure 13 is a sectional detail view taken substantially along the line XIII—XIII of Figure 12.
Figure 14 is a fragmentary sectional plan view of a further modified device for securing the ends of the fender shield to the fender.
Figure 15 is a sectional view taken substantially along the line XV—XV of Figure 14.

For certain purposes it may be preferred to have a simple rotary latching structure in the end attaching means rather than a threaded stud structure of the type already described, and for this purpose the latching stud structure shown in Figs. 8 to 10 may be employed. To this end, a headed stud latch member 80 is carried by downturned flange 81 of a bracket 82 carried by the fender shield 22 and is adapted to engage with a downturned flange 83 on a hanger bracket 84 carried by the fender 20. Both of the brackets 82 and 84 are adapted to be made from suitable gauge of sheet metal bent to form.

The shank of the stud 80 is preferably formed smoothly cylindrical to bear in freely rotatable relation within an outwardly struck annular bearing flange 85 in the hanger flange 81, and a warped annular spring 86 acting between the head of the stud and the end of the bearing flange 85 tends normally to urge the stud outwardly. This acts normally to draw a latch finger 87 on the stud toward the flange 81. The latch finger 87 may be a simple sheet metal plate having an end turned to afford a cam 88 and having an aperture 89 adjacent its opposite end for receiving a reduced diameter shank terminal portion 90 of the stud 80 which is turned over or peened to provide a rivet head 91 holding the latch finger plate 87 fast. The shank portion 90 and the aperture 89 are preferably formed non-circular or flatted off at one side, as indicated at 92 to key the stud shank and latch finger against relative rotation.

Assembly of the latching stud 80 with the bracket flange 83 after the brackets 82 and 84 have been brought together is effected by projecting the latching finger 87 through a horizontal receiving or clearance aperture 93 in the flange 83 by forcing the stud 80 longitudinally in opposition to the spring 85 and then turning the stud clockwise, as seen in Fig. 8, to swing the finger 87 into full latching position wherein it engages a stop 94. This stop is pressed out of the plane of the flange 83 and preferably defines the latching position of the latching finger 87 three quarters of a turn from its initial assembly position with the flange 83. Unlatching is simply effected by turning the stud 80 counterclockwise until the latching finger 87 is stopped by the stop projection 94 in register with the aperture 93 whereupon the spring 85 returns the latching finger 87 through the aperture 93 out of engagement with the flange 83. During the latching engagement of the finger 87 with the flange 83, the spring 85 acts to provide a resilient tensioning force which assures a snug engagement of the fender shield 22 with the fender 20 and also affords sufficient frictional interengagement between the latching finger 87 and the flange 83 to avoid unintentional turning of the stud 80 out of the latching position.

In another form of the latch, as shown in Figs. 12 and 13, an angular bracket 95 is supported by the fender shield 22 and has a downwardly extending inner flange 97 carrying a latch member 98 in the form of a headed stud extending through an aperture 99 in the flange 97 and having a latching cam 100 secured to its inner terminal portion. The latching cam 100 is of a volute design having a leading edge 101 which is adapted to enter freely, upon clockwise rotation as seen in Fig. 11, into camming engagement with a reinforcing and follower flange 102 on a depending flange portion 103 of a bracket member 104 carried by the fender 20. As the cam latch 100 continues to rotate clockwise by turning of the stud 98, it draws the stud head axially inwardly against a warped washer spring 105 between the head of the stud and the flange 97, and thereby also resiliently draws the fender shield 22 into full assembly with the fender. At maximum latching position, the leading edge 101 of the cam latch 100 engages a stop arm 107 which is preferably struck integrally from the flange 97 to extend into the path of the leading cam edge.

In Figure 11 the full outline position of the cam latch 100 shows it in full latching position and the dot-dash outline position shows it open and with the trailing or latching edge thereof engaging the stop arm 107. In the latter position the leading cam edge 101 clears under the bracket flange 103 and permits the fender shield 22 to be swung into and out of asembled position with the fender 20. In the non-latching or latching positions of the cam edge 100, the spring 105 affords sufficient frictional resistance to hold the latching member against unintentional turning.

In the additional form of rotary attachment device shown in Figures 14 and 15, a hook type of latch 108 is carried by the fender shield 22 and is adapted to engage with a latching bracket 109 carried by the fender 20. The latch 108 is formed with a terminal hub 110 in its plane having a flat sided generally round aperture 111 therethrough through which projects a flatted shank of a rotary stud 112 having the inner end thereof turned over or peened to provide a retaining head 113 on the order of a rivet head. The stud 112 projects through an aperture 114 provided therefor in the superimposed fender shield margin 39 and reinforcing bar 38. A spacer 115 is interposed between the reinforcing bar 38 and the adjacent side of the latch hub 110. Rotation of the latch 108 from the broken line non-latching position as shown in Fig. 14 to the full line latching position shown is effected by appropriately turning the stud 112 by means of a suitable wrench.

The bracket 109 preferably comprises a plate which is secured to the upper surface of the fender 20 adjacent to the flange 23 as by means of spot welding 117 and has an upstanding keeper flange 118 formed with a keeper slot 119. The end of the keeper slot 119 nearest the latch 108, identified at 120, is appropriately disposed in line with the axis of the stud 112 and in a plane substantially parallel to the meeting plane of the fender shield and fender flanges 23 and 25, respectively, and is adapted to be engaged by a latching cam 121 on the inside terminal of the latch hook 108 when the latter is turned into the full latching position. This position of the keeper flange 118 relative to the latching member 108 is such that a tensioned relationship is afforded which acts not only to hold the fender and fender shield in snug, assembled relationship but also maintains such a cammed interrelationship between the keeper slot and the cam radius 121 as to hold the latching hook 108 against unintentional release. By preference, the material of the keeper flange 118 struck out in providing the keeper slot 119 is bent inwardly into clearance with respect to the latch hook 108 but in position to provide a guard as shown at 122 to prevent anything accidentally brushing against or being caught on the latch hook 108 and swinging it unintentionally out of the latching position.

From the foregoing it will be apparent that the present invention provides a new and improved fender and fender shield assembly wherein the fender shield is adapted to be applied hingedly to the top of the wheel access opening in the fender and is then adapted to be swung down to fully assembled relationship with the fender. In the fully assembled relationship the fender shield is held by attaching means at the end of the fender shield. Such end attaching means may be in the form of rotatable attaching members which are carried by the fender shield and are easily and quickly turned into securing relation with the bracket structure carried by the fender by manipulating same with a convenient wrench such as a socket wrench which is used for the bolts that hold the wheel on the hub of the vehicle.

Removal of the fender shield is an equally expeditious maneuver, just the reverse of the mounting and attaching maneuver.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. In combination in a fender shield attaching means a hinge plate arranged to be carried by a fender shield and having a bearing hook formation at one end thereof, a bail-like cooperating hinge member having a hinge bar pivotally received within said bearing hook, said bail-like member having arms extending angularly from the hinge bar and coaxial pintle portions extending angularly from the extremities of the arms remote from the hinge bar, and bearings for said pintle portions adapted to be mounted on a fender with which the fender shield is adapted to be assembled by engagement of the bearing hook upon the hinge bar and swinging of the fender shield into place on the fender.

2. In combination in a securing means for a fender and fender shield assembly, a supporting member adapted to be carried by the fender shield, a supporting member adapted to be carried by the fender, a stud having a pilot tip thereon and an intermediate threaded portion and being supported by the fender shield carried member, and a nut supported by said fender carried member and adapted in assembly of the fender shield with the fender to receive said pilot and have the threaded portion of the stud secured therein.

3. In combination in means for securing a fender and fender shield in assembly, a pair of separable cooperating bracket members, said bracket members being adapted to be carried by the fender shield and the fender respectively, a stud carried by one of said bracket members and including a latch portion, the remaining bracket member having keeper structure thereon engageable by said latch portion upon assembly of the fender shield with the fender to bring the latch portion into operative relation to the keeper structure and effecting rotation of the stud, and a tensioning spring cooperating with said stud to maintain the latch portion under tension.

4. In means for securing a fender and fender shield together, a hook shaped latch member, a rotary structure carrying said latch member, a keeper member having a keeper slot therein including a keeper edge engageable by said hook latch, and a guard structure carried by said keeper for protecting the latch from unintentional displacement from the keeper, one of said members being arranged to be supported by the fender shield and the other of said members being arranged to be carried by the fender in such relationship that upon assembly of the fender shield with the fender the members are disposed in operative adjacency for rotation of the rotary structure to engage the hook latch with the keeper edge.

5. In combination in a fender and fender shield assembly, a fender having a wheel access opening defined by an inwardly extending upper marginal flange, a fender shield constructed and arranged to close said wheel access opening, a hinge member pivotally carried by said flange and adapted to swing from a generally upright position above said flange to a generally downwardly projecting position wherein the extremity portion thereof hangs down to a position where it is readily accessible through the wheel access opening, and a member carried by the inside upper margin of the fender shield and projecting above the upper edge of the fender shield, said member having an extremity portion interengageable with the extremity of said hinge member and in assembly swinging said hinge member between the generally upright and generally downwardly extending positions thereof in response to swinging movements of the fender shield, the construction and relationship of said hinge member and said fender shield carried member being such that in the generally upright position of the hinge member the fender shield is retained in closing relation to the wheel access opening and is supported by said fender flange through said members.

6. In a fender and fender shield assembly including a fender having a wheel access opening and a fender shield closing said opening, a hinge member hingedly attached to the inside of the margin defining the upper portion of the fender at the wheel access opening, said hinge member extending upwardly to a substantial extent, and a member extending upwardly at the inside margin of the fender shield and having its upper extremity pivotally connected to the upper extremity of said hinge member, the construction and relationship of said hinge member and said fender shield carried member being such that the fender shield is supported by the margin of the fender through said hinge member and said fender shield carried member, said members being swingable by swinging of the fender shield outwardly relative to the fender until by pivoting of the hinge member about its lower pivotal connection to the fender and pivoting of the members about their upper extremity pivotal connection the hinge member swings down until its upper extremity is substantially below the adjacent fender margin.

7. In combination in a fender and fender shield assembly including a fender having a wheel access opening and a fender shield closing said opening, the fender having an inwardly extending flange defining the upper margin about said wheel access opening, journal members carried by said flange, a bail-like hinge member having pintles at the extremities of the arms thereof pivotally assembled with said journals, the central intermediate portion of the hinge member comprising a horizontal hinge bar, said hinge member being swingable from a generally upright position to a position wherein it extends generally downwardly below said flange and is exposed in the wheel access opening, the fender shield having at the inner face of the upper margin thereof a reinforcing plate member, and a hinge plate secured to said reinforcing plate member and extending beyond the upper margin of the fender shield, said hinge plate having a bearing hook extremity pivotally interengaged with said hinge bar and releasable and attachable to said hinge bar when the hinge member is in its downward position in response to a relative downward movement of the hinge plate for release and upward movement of the hinge plate for pivotal interengagement, said hinge member and said hinge plate in the wheel access opening closing relationship of the fender shield being so related that the weight of the fender shield is supported by said fender flange through the arms of said hinge member and said hinge plate as a result of the hook extremity of the hinge plate hanging on the horizontal bar of the hinge member.

8. In combination in a fender and fender shield assembly including a fender having a wheel access opening and a fender shield for closing said opening, the fender having the lower margin thereof at each end of the wheel access opening underslung on a radius extending downwardly and inwardly to a substantial extent, the fender having the lower end portions thereof underslung to extend generally downwardly on a radius inwardly complementary to the lower marginal portions of the fender, means connecting the upper margin of the fender shield to the fender for swinging assembly of the fender shield with the fender so that in the assembly operation the lower end portions of the fender shield approach the lower inturned marginal portions of the fender incident to inward movement of the lower portion of the fender shield, a bracket carried by each of the respective underslung marginal portions of the fender at each end of the wheel access opening, each of said brackets having a securing flange portion secured to the generally upwardly facing surface of the respective fender marginal portion carrying the same and a flange extending angularly to the secured flange and projecting beyond the edge of the carrying fender margin, each extending flange including means for receiving and interengaging with retaining means on the fender shield, and an attachment assembly carried by each respective underslung end lower marginal portion of the fender shield and including a rotatable member accessible from the outer side of the fender shield and releasably engaging said receiving and interengaging means on the respective fender-carried bracket extending flange, said rotatable member including means interengageable with the means on the extending flange of the fender-carried companion bracket by rotation of the rotatable member in one direction and releasable from said means on the fender bracket extending flange by rotation of said rotatable member in the opposite direction, said extending flange on each of the fender carried brackets being so disposed that effective registration for interengagement of said means results from swinging the fender shield into position with the underslung portions of the fender and the fender shield in complementary cooperation.

9. In combination in a fender and fender shield assembly, including a fender having a wheel access opening and a fender shield closing said opening, the lower marginal portions of the fender and the fender shield at the ends of the wheel access opening being underslung on a radius and extending inwardly to a substantial extent from the general outer vertical plane of the fender and fender shield, a bracket secured to the upwardly facing marginal area of the underslung portion of the fender at each respective end of the opening and each of the brackets having a downwardly extending flange portion depending substantially below the extremity of the margin on which the bracket is carried, each underslung end portion of the fender shield having a bracket including a flange secured to the fender shield margin and a depending flange extending below the fender shield margin, the depending flanges of the adjacent brackets on the fender and the fender shield being cooperatively related in assembly, said depending flanges having connecting means interengageable and disconnectable by rotary movement and including a rotatable member accessible from the outer side of the assembly below the respective underslung cooperating marginal portions of the fender and fender shield.

10. In combination in a fender and fender shield assembly, including a fender having a wheel access opening and a fender shield for closing said opening, the fender having a bracket attached thereto on the lower margin at one end of the wheel access opening, said bracket having a portion thereof extending downwardly below the edge of the fender and having an aperture therethrough, a member having a threaded aperture coaxial with said aperture in the depending portion and secured in the aperture of said depending portion, a bracket secured to the lower end margin of the fender shield and having a depending portion in assembly overlapping said depending portion of the fender bracket, a stud having a pilot tip and an intermediate threaded portion, said depending portion of the fender shield bracket having an aperture therethrough registering coaxially with the aperture in the depending portion of the fender bracket, said stud extending through said fender shield bracket depending portion aperture, and means maintaining the stud in freely rotatable assembled relation with the depending bracket portion by which it is carried, said stud being automatically engageable within said threaded apertured member as an incident to movement of the fender shield into assembly with the fender, the threaded portion of the stud being engageable within the threaded aperture of said member by turning the stud for securing the fender shield to the fender.

11. In combination in a fender and fender shield assembly, including a fender having a wheel access opening and a fender shield closing said opening, the fender having an underslung lower marginal portion at one end of the wheel access opening, a bracket secured to said underslung portion and having a flange projecting angularly therefrom, and a latch assembly carried by the end portion of the fender shield adjacent to said underslung fender portion, said latch assembly including a stud having a wrench engageable head accessible from the outer side of the fender and fender shield assembly and a shank extending to the inner side of the assembly, said shank having a laterally extending swingable latch element engageable retainingly with said angular flange portion and disengageable therefrom by rotation of the stud.

12. In combination in means for securing a fender shield in position on a fender having the lower margin on an underslung radius, a bracket having a securing flange portion to be secured to the underslung marginal portion of the fender and a flange extending angularly from the securing flange to project beyond the underslung margin of the fender and including means for receiving and interengaging with retaining means on the fender shield, and an attachment assembly constructed and arranged to be carried by the fender shield on that portion of the fender shield which cooperates with the underslung margin of the fender adjacent to the bracket, said attachment assembly including a rotatable member accessible from the outer side of the fender shield for engagement to be rotated and retaining means on the rotatable member interengageable with the receiving means of the fender bracket as an incident to rotation of said rotatable member for securing the bracket and attachment assembly together and thereby securing the fender and fender shield with which associated together.

13. In combination in means for attaching a fender and fender shield of the underslung end type together, an angular bracket having a flange portion for attachment to the fender and a flange portion to depend below the edge of the fender, said depending flange portion having an aperture therein, a nut having a collar extending coaxially through the flange aperture and permanently peened into gripping relation with said flange about the margin defining said aperture so that the threaded hole of the nut is coaxial with said aperture, an angular bracket having a flange portion adapted to be secured to the end margin of a fender shield and an angular flange arranged to depend below the margin of the fender shield and in assembly to overlap the depending flange of the fender bracket, said depending flange of the fender shield bracket having an aperture therein, and a stud extending through said aperture and having a head on the outer side of the apertured fender shield bracket flange and a retaining collar at the inner side of such flange for retaining the stud in free rotatable assembled relation with such flange, said stud having a pilot tip for guiding the shank of the stud into said nut and an intermediate threaded portion threadedly and retainingly engageable with the threads of the nut, the nut and stud in assembly retaining said depending flange portions of the respective brackets in assembled relation.

14. In combination in attaching means for a fender and fender shield assembly, a bracket adapted to be secured to the lower margin of a fender adjacent to the wheel access opening therein and having a flange arranged to depend below the margin of the fender, a bracket adapted to be secured to the lower margin of a fender shield at the end of the fender shield and adjacent to the fender bracket, said fender shield bracket having a depending flange adapted to lie in closely adjacent cooperative relation to the depending flange of the fender bracket, a rotary stud carried by the depending flange of the fender shield bracket and having a laterally extending swingable latch element thereon, said latch element being swingable into overlapping relation behind the fender bracket flange to retain the brackets against separation in at least one direction normal to the planes of the depending flanges, one of said depending flanges having a stop projection thereon engageable by the latch element in the fully latched relation thereof to said fender carried bracket depending flange.

15. In combination in attaching means for a fender and fender shield assembly, a bracket adapted to be carried by the fender and a bracket adapted to be carried by the fender shield, said brackets having respective flanges overlapping in assembly, one of said flanges having a rotary stud assembled therewith and including a shank projecting substantially therebeyond and carrying at the inner extremity thereof a laterally extending latch finger, the other of said flanges having an elongated aperture therein for passage of said latch finger in non-latching relation of the latch finger as an incident to assembly of the brackets upon assembly of the fender shield with the fender, the stud being rotatable to swing the latch finger out of registry with the aperture into retaining engagement with the inner side of the apertured flange.

16. In combination in means for attaching a fender and fender shield in assembly, a bracket including a flange for attachment to the fender adjacent to its lower margin at one end of the wheel access opening and a flange angular to said attachment flange and extending in a direction to extend across and in spaced relation to the joint between the fender and fender shield, said angular flange having an opening therein providing a keeper edge, and a rotary hook latch member including a stud portion and a latching hook finger arranged to be rotatably supported by the margin of the fender shield adjacent to the outer side of said angular flange of said bracket and with the latching hook finger swingable into latching engagement about an edge of the angular flange of said bracket and into retaining engagement with said keeper edge at the inner side of the angular flange, whereby to draw the fender shield toward the fender.

17. In a fender shield construction for closing the wheel access opening in a fender, a fender shield panel, a bracket on a lower end portion of the fender shield and including a flange portion projecting beyond the adjacent edge of the panel, a bracket constructed to be carried in attached relation by the lower margin of the fender adjacent the wheel access opening and having a flange portion arranged to project beyond the edge of the fender, one of said flange portions having a part offset to extend across the joint between the fender and fender shield and to lie in overlapping relation to the flange portion of the other bracket upon movement of the fender shield into assembled relation with the fender for closing the wheel access opening, and means movably manipulable relative to the flange portions of the brackets and accessible from below the adjacent fender shield and fender lower margins for securing said offset part to the flange portion of said other bracket releasably but firmly together whereby to retain the fender shield in the assembled relation with the fender.

18. In a fender shield construction for closing the wheel access opening in a fender, a fender shield panel, a bracket on a lower end margin of the panel having a flange portion projecting beyond said margin, a bracket arranged to be secured to a lower end margin of the fender and having a flange portion projecting therefrom, one of said flange portions being offset relative to its bracket to extend across the joint between the fender and fender shield so that when the fender shield is assembled with the fender the flange portions of the brackets will lie in face-to-face relation accessible from below said fender shield panel and the adjacent lower margin of the fender, one of said flange portions carrying a nut and the other of said flange portions having an aperture therethrough registering with the threaded bore of the nut, and a stud arranged to extend through said aperture into threaded engagement within the nut to secure said flange portions of the brackets releasably but firmly together.

19. In combination in means for attaching a fender and fender shield in assembly, a bracket having a first flange supported by the fender and a second flange extending angularly from the first flange and having an aperture therein, said second flange having a side facing inwardly and another side facing outwardly relative to the fender, and a rotary latch member carried by the fender shield and in the assembly of the fender shield with the fender lying adjacent to the outer side of the second flange, said latch member including a latching portion having a latching finger arranged to swing around an edge of said second flange and to be received in said aperture and engageable with the inwardly facing side of said second flange, whereby to draw the fender shield toward the fender.

GEORGE W. SCHATZMAN.

REFERENCES CITED

The following references are of record in the file of this patent:

UNITED STATES PATENTS

| Number | Name | Date |
| --- | --- | --- |
| 556,713 | Giesler | Mar. 17, 1896 |
| 984,969 | Reiniger | Feb. 21, 1911 |
| 1,148,476 | Forsyth | July 27, 1915 |
| 1,526,182 | Rosenberg | Feb. 10, 1925 |
| 1,605,458 | Neeb | Nov. 2, 1926 |
| 2,017,564 | Claud-Mantle | Oct. 15, 1935 |
| 2,048,862 | Haltenberger | July 28, 1936 |
| 2,062,597 | Moore | Dec. 1, 1936 |
| 2,068,732 | Cadwallader | Jan. 26, 1937 |
| 2,118,256 | Lyon | May 24, 1938 |
| 2,239,373 | Schatzman et al. | Apr. 22, 1941 |
| 2,261,376 | Jandus | Nov. 4, 1941 |
| 2,267,421 | Purdy | Dec. 23, 1941 |
| 2,353,553 | Fergueson | July 11, 1944 |
| 2,415,695 | Kann | Feb. 11, 1947 |